United States Patent
Condon (10) Patent No.: US 6,845,785 B1
(45) Date of Patent: Jan. 25, 2005

(54) FLUSH-MOUNT SUPPLY LINE AND DRAIN CONNECTOR

(75) Inventor: Duane R. Condon, Ramona, CA (US)

(73) Assignee: LSP Products Group, Inc., Carson City, NV (US)

( * ) Notice: Subject to any disclaimer, the term of this patent is extended or adjusted under 35 U.S.C. 154(b) by 0 days.

(21) Appl. No.: 10/675,105

(22) Filed: Sep. 30, 2003

(51) Int. Cl.$^7$ ................................................. F16L 5/00
(52) U.S. Cl. .................. 137/360; 137/312; 137/315.01; 137/357
(58) Field of Search ................................. 137/357, 360, 137/315.01, 312

(56) References Cited

U.S. PATENT DOCUMENTS

| | | | |
|---|---|---|---|
| 3,009,167 A | | 11/1961 | Leonard, Jr. |
| 3,468,334 A | * | 9/1969 | Hamrick ................ 137/355.23 |
| 3,495,276 A | * | 2/1970 | Suess .......................... 52/270 |
| 4,554,948 A | | 11/1985 | Bergmann |
| 4,564,249 A | * | 1/1986 | Logsdon ..................... 312/229 |
| 4,716,925 A | | 1/1988 | Prather |
| 4,896,381 A | | 1/1990 | Hutto |
| 4,934,410 A | * | 6/1990 | Humber ....................... 137/360 |
| 5,094,258 A | | 3/1992 | Orlandi |
| 5,247,962 A | | 9/1993 | Walker |
| 5,469,882 A | | 11/1995 | Condon |
| 5,538,033 A | | 7/1996 | Condon |
| 5,577,530 A | | 11/1996 | Condon |
| 5,755,247 A | | 5/1998 | Condon |
| 5,881,999 A | | 3/1999 | Chen |
| 6,125,881 A | | 10/2000 | Hobbs et al. |
| 6,129,109 A | | 10/2000 | Humber |
| 6,148,850 A | | 11/2000 | Kopp et al. |
| D435,635 S | | 12/2000 | Taneya |
| 6,234,193 B1 | | 5/2001 | Hobbs et al. |
| 6,321,788 B1 | | 11/2001 | Egli |
| 6,378,912 B1 | | 4/2002 | Condon et al. |

* cited by examiner

*Primary Examiner*—A. Michael Chambers
(74) *Attorney, Agent, or Firm*—Monty L. Rose (57) ABSTRACT

A flush-mount connector system is provided for use in attaching supply line valves and drain elbows to in-wall plumbing lines without a conventional in-wall outlet box. The system desirably includes at least one mounting plate, at least one valve holder or drain elbow, and a removable cover panel. The valve holder and drain elbow are each insertable into frictional engagement with a hole in the mounting plate and are rotatable inside the hole to position an attached valve, valves or drain elbow as needed for connection to the in-wall plumbing lines.

21 Claims, 9 Drawing Sheets

FLUSH-MOUNT SUPPLY LINE AND DRAIN CONNECTOR

BACKGROUND OF THE INVENTION

1. Field of the Invention

This invention relates to apparatus useful for attaching water supply lines, drain lines and condensate lines to a wall structure without the need for a conventional outlet box of the type that is ordinarily used in the installation of appliances such as washing machines, ice makers, and the like. The invention also relates to apparatus suitable for pressure testing such plumbing installations prior to use.

2. Description of Related Art

The use of so-called "washing machine outlet boxes" made of molded plastic or metal has become widespread in home construction and remodeling during recent years. More recently, such boxes have also been used in connecting other appliances like water filters or ice makers and for connecting condensate drains to in-wall plumbing. The conventional outlet boxes are typically deep enough to receive supply line valves and drain fittings but shallow enough that they fit between drywall installed on opposite sides of 2×4 inch studs. A molded plastic frame attachable to the front of the outlet boxes is often provided to cover visible edges of the box or surrounding drywall. Illustrative devices disclosed in the patent literature include, for example, U.S. Pat. Nos. 3,009,167; 4,554,948; 4,716,925; 4,896,381; 5,094,258; 5,247,962; 5,469,882; 5,538,033; 5,577,530; 5,881,999; 6,125,881; 6,129,109; 6,148,850; 6,234,193; 6,321,788; 6,378,912 and Des. 435,635.

One difficulty that has arisen in using the commercially available molded plastic outlet boxes is the variability of the in-wall plumbing lines and wall structures that must be accommodated. For example, the water supply lines may be installed on either side of a larger-diameter drain line, and may be in the same or a different stud bay. Supply lines may enter from the top, bottom, or a side, and condensate lines frequently enter through the top. This variability has required manufacturers and distributors to produce and stock outlet boxes in many different configurations or to design more complex outlet boxes that are reversible or have extra ports and knock-outs. Molding such complex boxes also increases tooling costs to manufacturers.

A connector system is needed that is conveniently attachable to a wall structure; that has a shallow profile; that is adaptable for use with single or dual supply lines approaching form any direction; that will accommodate more than one drain, purge or condensate line; and that is equipped to facilitate pressure testing.

SUMMARY OF THE INVENTION

The connector system disclosed herein facilitates the installation of connectors to in-wall water supply and drain lines, regardless of whether the lines are situated in the same or different stud bays and regardless of the direction in which the lines are positioned inside the wall. The invention can be used in one form or another for installing and connecting single or dual supply lines and valves, and condensate, drain or purge lines, to a variety of appliances and applications including, for example, washing machines, water softeners, ice machines, appliances and the like without the need for a conventional in-wall outlet box. Having a slim profile, the subject connector system reduces space requirements for storage, shipping and installation as compared to conventional outlet boxes. It also reduces the amount of supply line and drain pipe work that must be done behind the wall and easily accommodates off-center installations of in-wall supply and drain lines, installations located on either side of the other, or in different stud bays, or in which lines approach from top, bottom or side. The system of the invention can be used to connect supply lines and drain lines either in combination or separately. The connector system of the invention can be used to connect valves and drain elbows any commercially available polymeric or copper pipe or tubing.

According to one embodiment of the invention, a flush-mount connector system is provided that comprises at least one mounting plate, at least one valve holder or drain elbow, and a removable cover panel, which can be made of the same or different materials. Preferably, the subject connector system will comprise both a valve holder and a drain elbow, and will further comprise both one-hole and two-hole mounting plates to facilitate installation of supply line and drain connections either in combination or separately as desired. The valve holder and drain elbow are each preferably insertable into frictional engagement with a hole in the mounting plate and are rotatable inside the hole to position an attached valve, valves or drain elbow as needed for connection to the in-wall plumbing lines. A plurality of straps are also desirably provided that are releasably attachable to the mounting plate and are attachable to the studs or lateral braces inside a wall. The straps are useful for supporting the mounting plate between studs where direct attachment of the mounting plate to the studs is not convenient.

A preferred drain elbow for use in the invention also comprises a removable test cap and a forwardly facing male hose connector with a removable test plug and a condensate connection port having a removable cover. The unique, built-in hose thread on the test cap reduces the time taken to fill and test the drain waste system by placing supply lines closer to a drain inlet. Optionally, the drain elbow preferred for use in the invention further comprises a condensate line connection port disposed behind the wall. The connection port desirably has a cover that is conveniently removable when the port is used.

BRIEF DESCRIPTION OF THE DRAWINGS

The apparatus of the invention is further described and explained in relation to the following figures of the drawings wherein.

DESCRIPTION OF THE PREFERRED EMBODIMENTS

Figure 1:
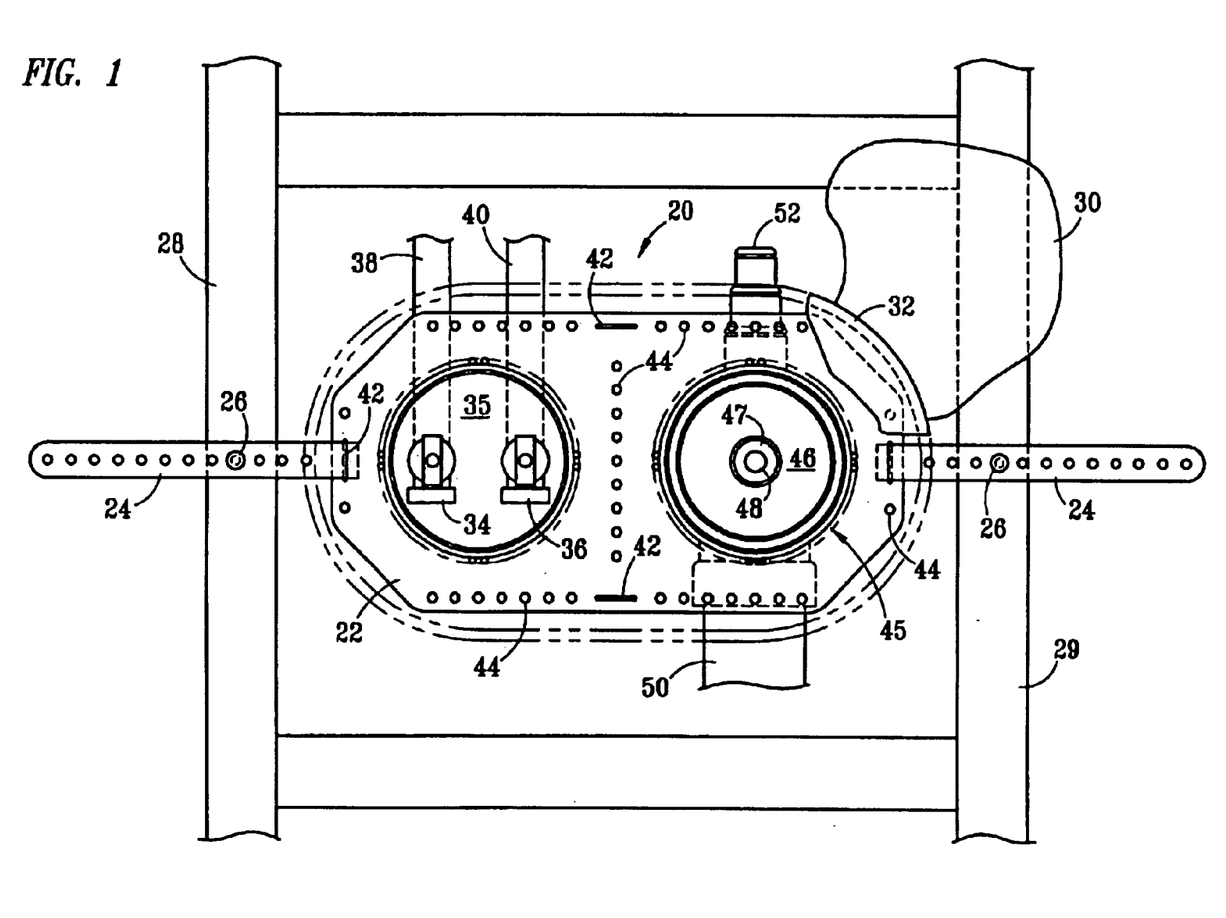
FIG. 1 is a front elevation view, partially broken away, of a preferred combined flush-mount supply line and drain connector system of the invention as installed horizontally in a single stud bay of a wall, with a portion of the cover broken away and shown in phantom outline.

Referring to FIG. 1, combined flush-mount supply line and drain connector system 20 of the invention is depicted as installed with dual supply line valves 34, 36 and drain elbow 45 disposed in substantially horizontal alignment inside a single stud bay having sides defined by studs 28, 29. Drywall 30 and removable mounting plate cover 32 are broken away to better illustrate the other components of connector system 20. Connector system 20 further comprises two-hole mounting plate 22, which is supported between studs 28, 29 by straps 24 that are releasably attachable to mounting plate 22 at slots 42 and that are secured to studs 28, 29 by fasteners 26 such as nails, screws, or the like. A plurality of smaller mounting holes 44 are desirably provided in mounting plate 22 for use in attaching mounting plate 22 directly to a stud without the need for using straps 24 where the spacing of water supply lines 38, 40 and drain pipe 50 permit. Dual supply valves 34, 36, typically for hot and cold water, are preferably commercially available quarter-turn valves attached to dual valve holder 35 by inserting the base of the valve through an aperture (visible in FIGS. 14–16) in valve holder 35 and then threading an engagement nut onto the valve base behind valve holder 35.

Valve holder 35 preferably comprises a substantially cylindrical collar that is insertable in any desired rotational position into an aperture provided for that purpose in mounting plate 22 (further described below in relation to FIG. 11) and held there by frictional engagement between a plurality of circumferentially spaced projections on mounting plate 22 and a plurality of cooperating, axially spaced, circumferentially extending ridges on the outside of dual valve holder 35, as are further described below in relation to FIGS. 14–16. A forwardly projecting, substantially cylindrical collar of drain elbow 45 is likewise rotatable to a desired angular position in the plane of mounting plate 22 and is insertable into frictional engagement with mounting plate 22 through a second aperture in mounting plate 22, as further described below in relation to FIGS. 4, 6 and 11.

A connector port capped by removable cover 52 is desirably provided at the top of drain elbow 45 and behind drywall 30 for optional use in attaching another drain or purge line, such as a condensate drain line, that can discharge into drain pipe 50. Removable cover 52 is preferably spaced at least 1–1.5 inches above the top interior portion of the main drain passageway inside drain elbow 45 to provide an air gap normally required by plumbing codes. A forwardly facing, removable test cap 46 is preferably provided on the front of drain elbow collar 45 for use in pressure testing the drain waste system. Removable test cap 46 preferably further comprises a forwardly extending, male threaded hose connector 47 having an interior bore to which access is gained by removal of test plug 48 for pressure testing. Test cap 46, male-threaded hose connector 47 and test plug 48 desirably cooperate to provide a fluid-tight front seal for drain elbow 45 until removal.

Figure 2:
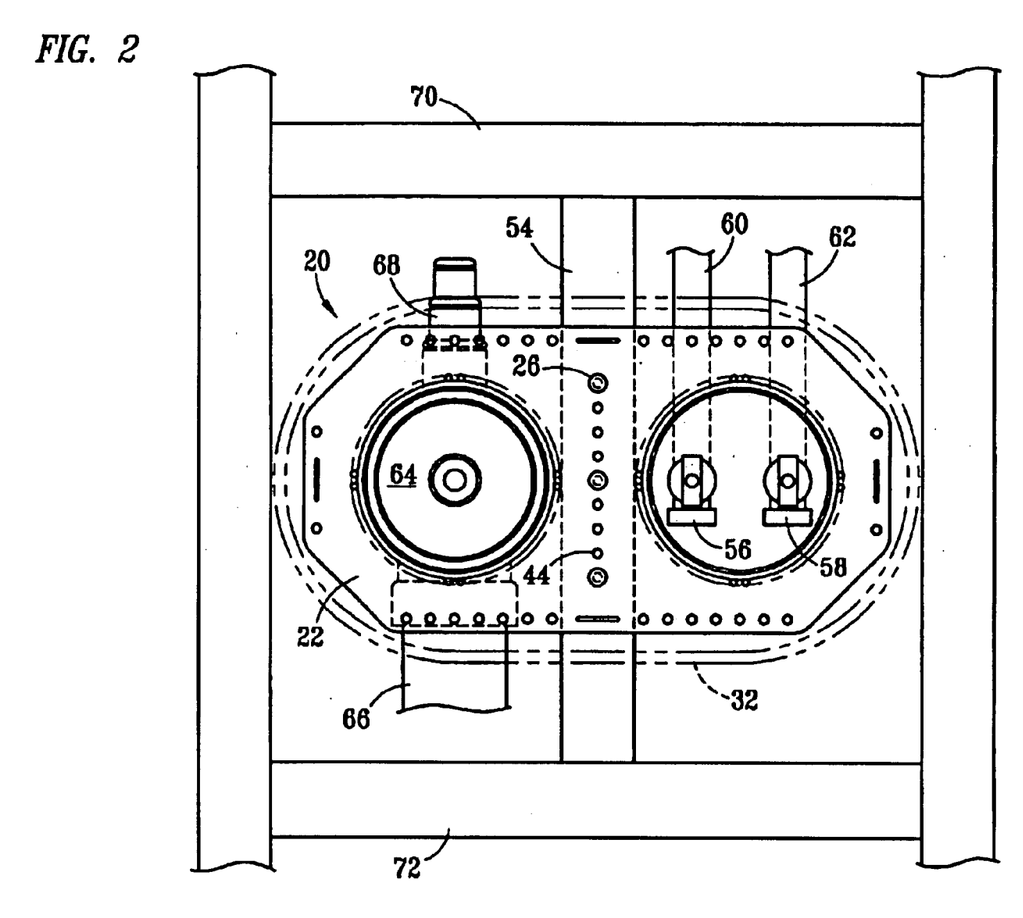
FIG. 2 is the flush-mount supply line and drain connector system of FIG. 1, but installed over a stud and bridging into a second stud bay, with the supply line connections and drain line connection reversed left-to-right from the position shown in FIG. 1, and with the cover shown only in phantom outline.

FIG. 2 depicts a similar installation in which flush-mount connector system 20 is used to connect valves 56, 58 to supply lines 60, 62 located on one side of vertical brace 54 and to connect drain elbow 68 comprising forwardly facing test cap 64 to drain pipe 66 disposed on the opposite side of vertical brace 54. In this installation, fasteners 26 are inserted through mounting holes 44 in mounting plate 22 and directly into vertical brace 54, disposed between lateral braces 70, 72, thereby eliminating the need for using straps 24 as described in relation to FIG. 1. It is also apparent by looking at this drawing in comparison to FIG. 1 that mounting plate 22 can be used just as effectively with the drain line located either to the left or to the right of the supply lines.

Figure 3:
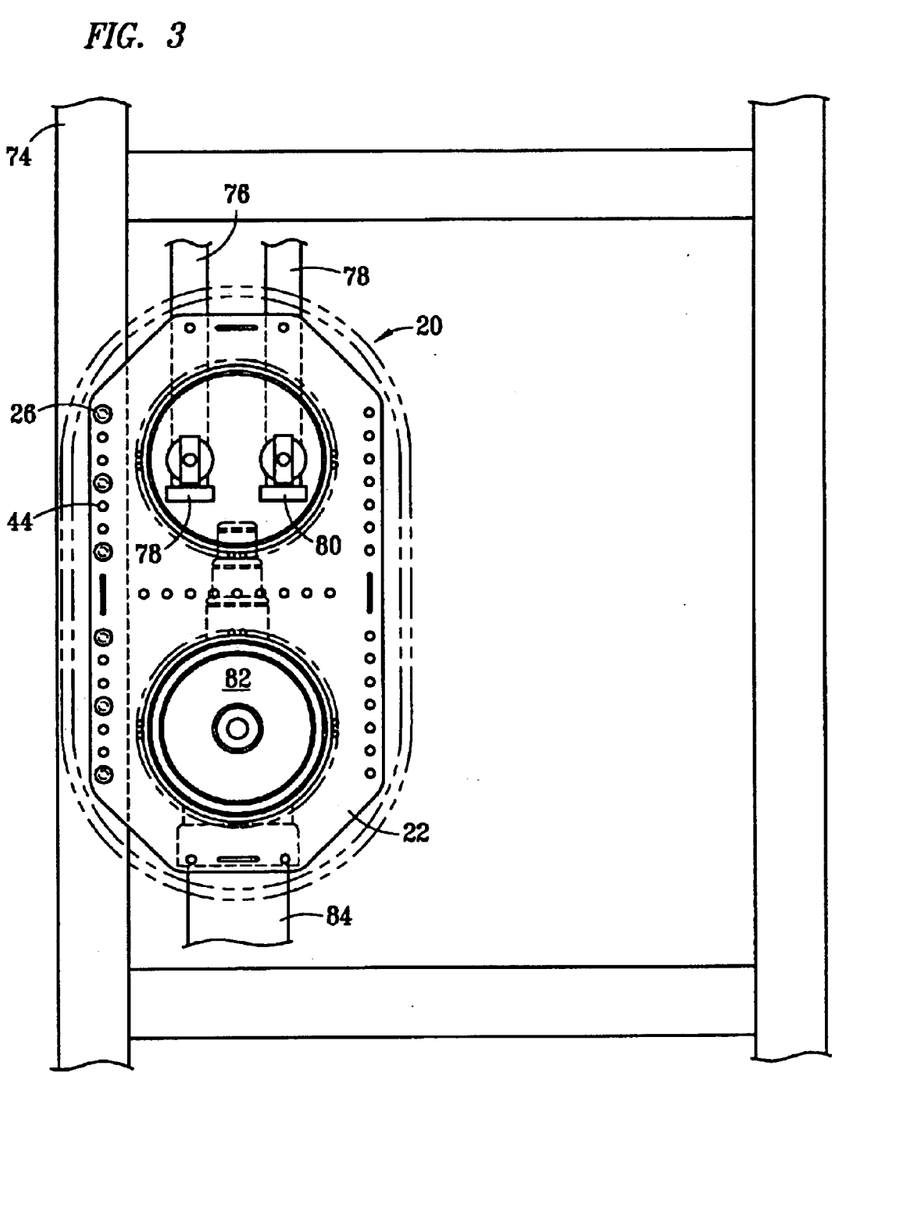
FIG. 3 is a front elevation view of a preferred combined flush-mount supply line and drain connector system of the invention as installed vertically in a single stud bay of a wall, with the cover shown in phantom outline.

FIG. 3 depicts a similar installation in which flush-mount connector system 20 is used to connect supply valves 78, 80 to supply lines 76, 78, respectively, that are located above drain elbow test cap 82 in the same stud bay adjacent to stud 74. In this installation, fasteners 26 are inserted through mounting holes 44 in mounting plate 22 and directly into stud 74, thereby again eliminating the need for using straps 24 as described in relation to FIG. 1.

Figure 4:
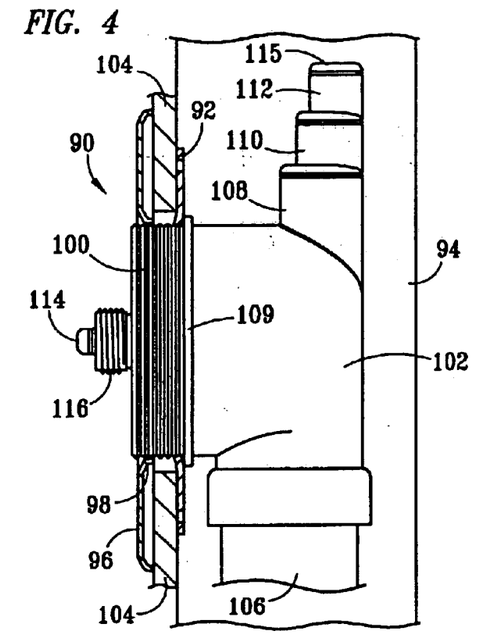
FIG. 4 is an enlarged side elevation view, partially in cross-section, of a preferred flush-mount drain connector assembly of the invention as installed in a stud bay.

FIG. 4 depicts flush-mount connector system 90 in relation to stud 94 and drywall 104, and illustrates the slim profile achieved through use of this system. Drain elbow 102 is supported by mounting plate 92 and is attached to drain pipe 106. Drain elbow 102 preferably further comprises a forwardly projecting, substantially cylindrical collar 100 having on its outside surface a plurality of axially spaced, circumferentially extending ridges that frictionally engage mounting plate 92, and a larger-diameter flange 109 disposed behind collar 100 to abut against the back side of mounting plate 92. Male-threaded hose connector 116 projects forwardly of the test cap (not visible) disposed inside the perimeter of collar 100, and removable test plug 114 projects forwardly of hose connector 116. Removable cover 96 further comprises projections 98 that frictionally engage collar 100 to hold cover 96 in place over mounting plate 92 and a portion of drywall 104. At the top rear of drain elbow 102, condensation connection port 108 is provided with progressively smaller diameter conduit sections 110, 112 to facilitate use with various diameter drain lines or fittings. The minimum air gap is desirably established by the base section of condensate connection port 108. Cap 115 is provided at the top of the uppermost section 112, although it will be appreciated that conduit section 112 and cap 115 function cooperatively as a cap if removed together to permit, for example, the insertion of a condensate drain line directly into conduit section 110.

Figure 5:
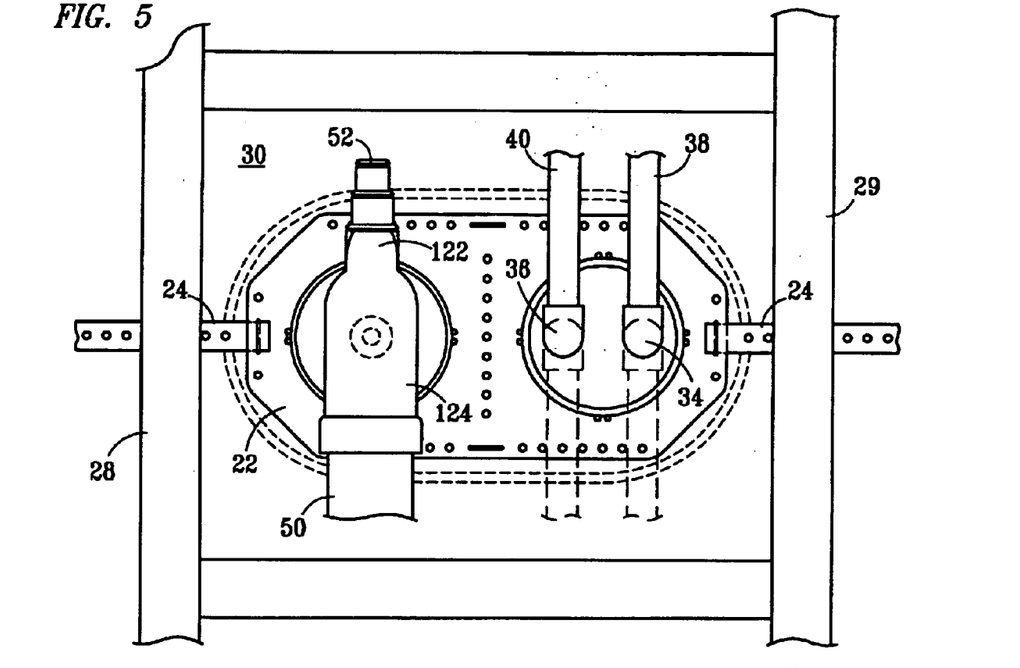
FIG. 5 is a rear elevation view of the combined flush-mount supply line and drain connector system of the invention as depicted in FIG. 1, with the entire cover shown in hidden outline.

FIG. 5 depicts the rear view of mounting plate 22 attached by straps 24 to studs 28, 29. In this view, the mounting plate cover is drawn in hidden outline because it is disposed on the opposite side of drywall 30. Drain elbow 124 is connected to drain pipe 50 and condensate port 122 at the top of the drain elbow is sealed at the top by removable cap 52. Supply valves 34, 36 are attached to upwardly extending supply lines 38, 40, respectively, and dashed outlines are provided to show how supply valves 34, 36 can just as easily be connected to downwardly extending supply lines if needed.

Figure 6:
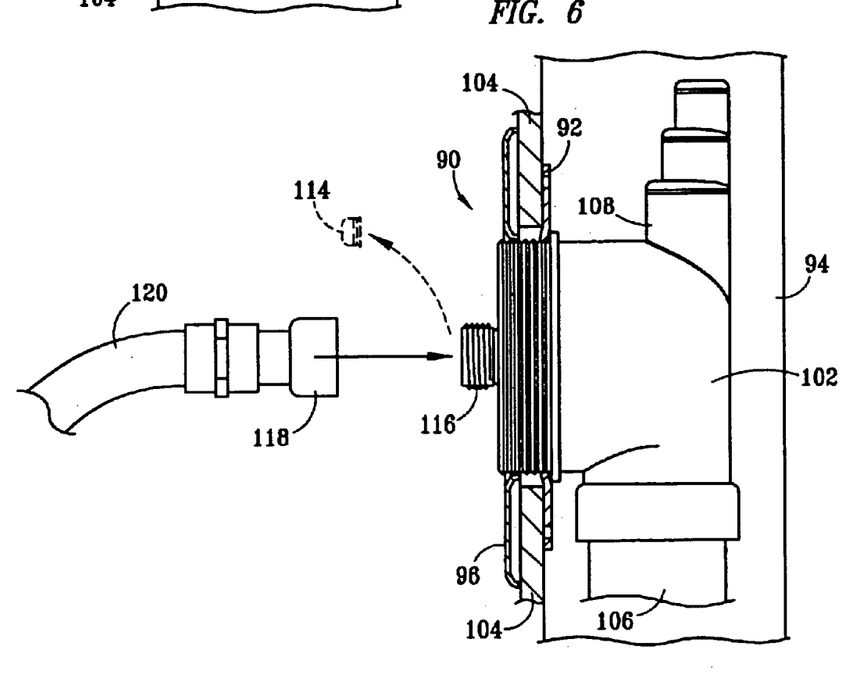
FIG. 6 is the same structure as shown in FIG. 4, but with the test plug removed to facilitate use of a hose segment for pressure testing the drain waste system.
Figure 7:
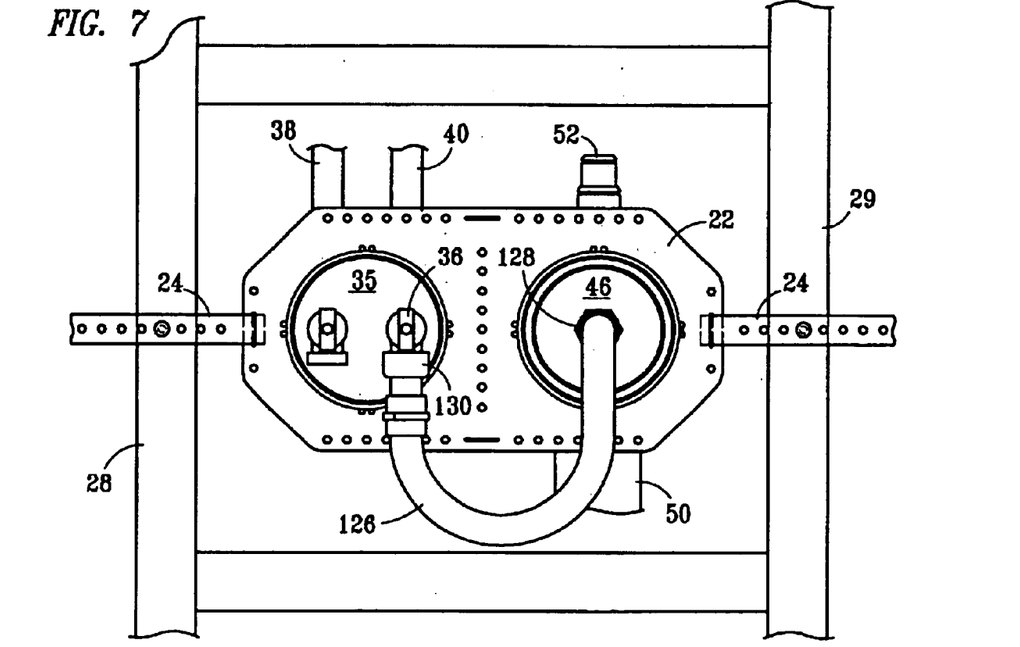
FIG. 7 is the same structure as shown in FIG. 1, but with the cover removed and with a hose segment connecting the supply and drain sides for use in pressure testing the drain waste system.

FIG. 6 depicts connection system 90 of FIG. 4 in which test plug 114 has been removed from hose connector 116 to facilitate the connection of female fitting 118 of hose 120 for use in testing the drain waste system for leaks. Similarly, FIG. 7 depicts the connector system installation of FIG. 1 wherein hose segment 126 comprises end fittings 128, 130 that are attachable to test cap 46 and supply valve 36, respectively, for use in leak testing the drain waste system.

Figures 8, 9:
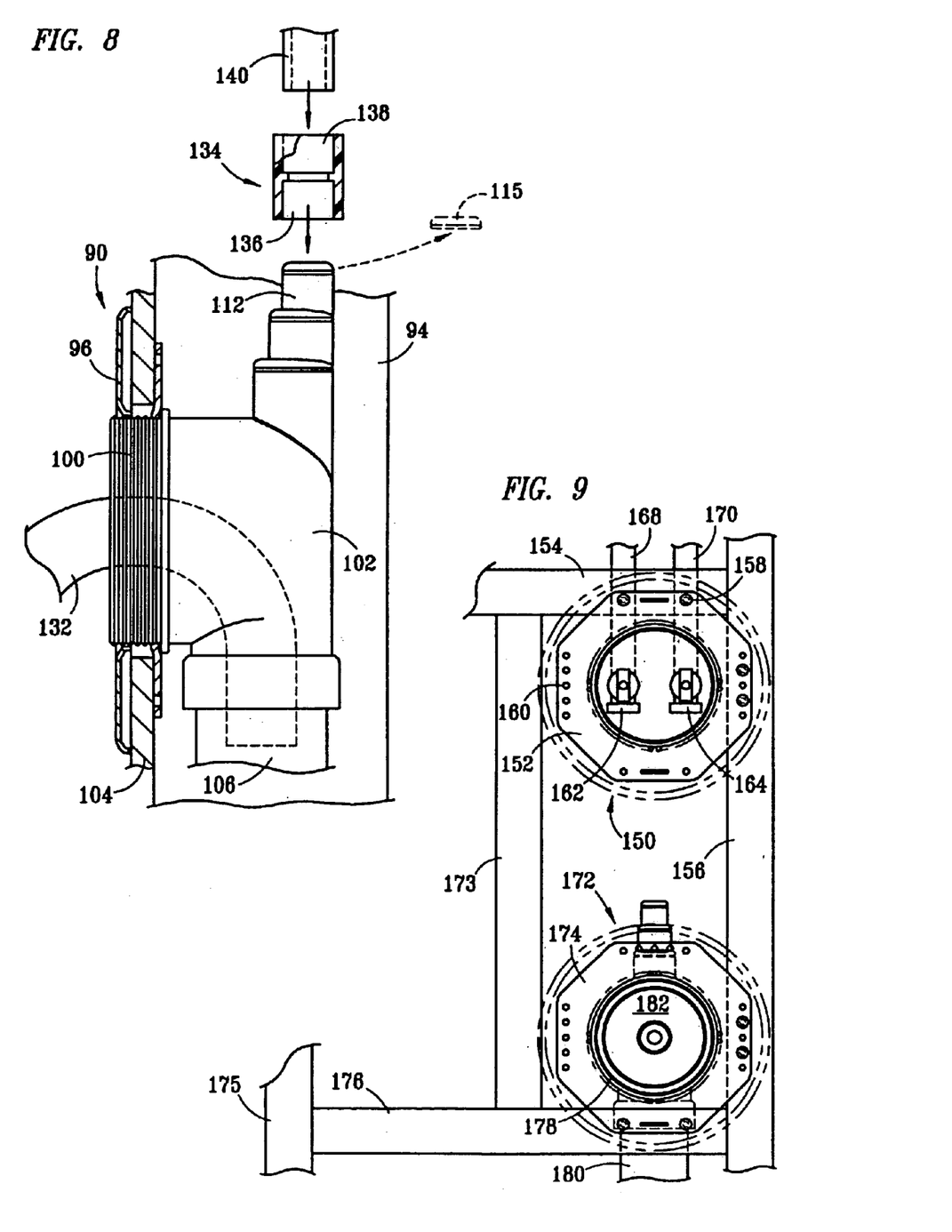
FIG. 8 shows the same structure as depicted in FIG. 4, but with the front panel of the drain elbow removed, a drain hose inserted into the drain elbow, and an exploded section showing a condensate line and attachment fitting prior to assembly onto the top of the drain elbow.
FIG. 9 is a front elevation view of separate flush-mount supply line and drain connector assemblies of the connector system of the invention as installed vertically in a single stud bay, with the supply line connector assembly disposed above the drain connector assembly and with the covers shown in phantom outline.

FIG. 8 depicts flush-mount connector system 90 as in FIGS. 4 and 6, wherein the hose connector and test cap have been removed following leak testing to permit the insertion of washing machine drain hose 132 into drain pipe 106. Also, cap 115 has been removed from uppermost conduit section 112 to permit the attachment of polymeric fitting 134 having opposed female ends 136, 138 attachable to conduit section 112 and drain line 140, respectively.

FIG. 9 depicts two flush-mount connector systems 150, 172 installed in a single bay between stud 156 and vertical brace 173, and between lateral braces 154, 176 connecting stud 156 to stud 175. Connector system 150 comprises mounting plate 152 attached directly to stud 156 and lateral brace 154 by fasteners 158 inserted through mounting holes 160. Supply valves 162, 164 are supported by mounting plate 152 and are attached to upwardly extending supply lines 168, 170. Connector system 172 comprises mounting plate 174, which is similarly attached directly to stud 156 and lateral brace 176. Drain elbow collar 178 comprising test cap 182 is supported by mounting plate 152 and the drain elbow is connected to drain pipe 180 inside the wall. In both flush-mount connector systems of FIG. 9, the front covers are removed but are shown in phantom outline.

Figure 10:
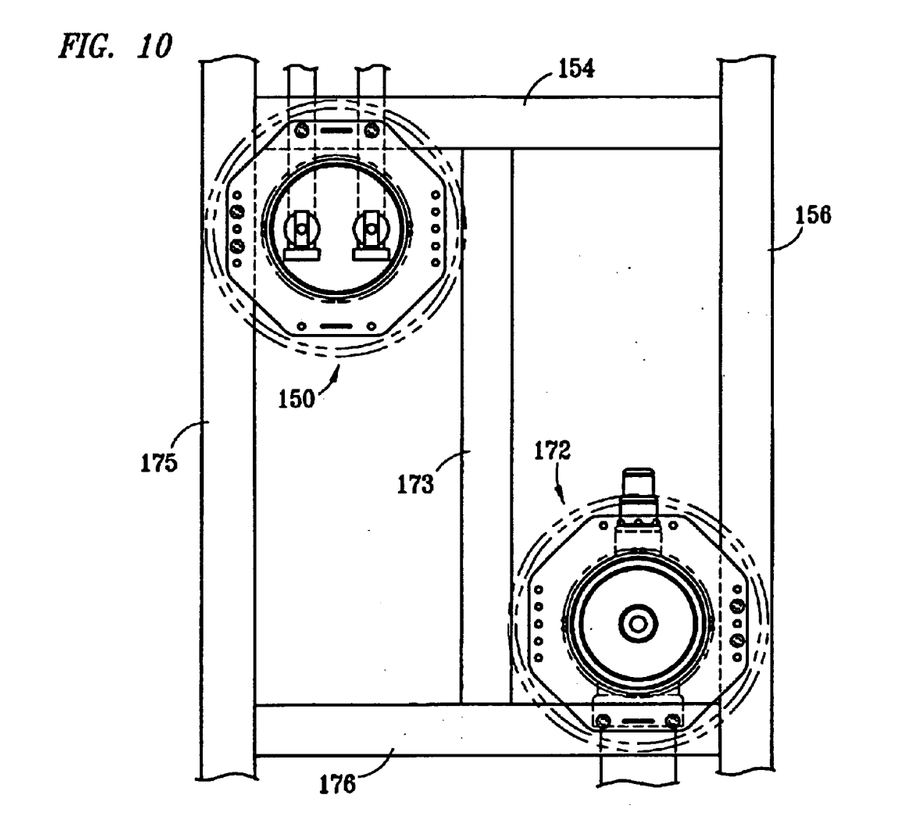
FIG. 10 is a front elevation view of the separate flush-mount supply line and drain connector system substantially as shown in FIG. 9 but installed in different stud bays.

FIG. 10 depicts flush-mount supply valve connector system 150 as described above installed in a bay defined by stud 175 and vertical brace 173, which extends between lateral braces 154, 176. In this case, the mounting plate is attached directly to lateral brace 154 and to stud 175. FIG. 10 also depicts flush-mount drain elbow connector system 172 as described above installed in a bay defined by stud 156 and vertical brace 173, which extends between lateral braces 154, 176. In this case, the mounting plate is attached directly to stud 156 and to lateral brace 176.

Figure 11:
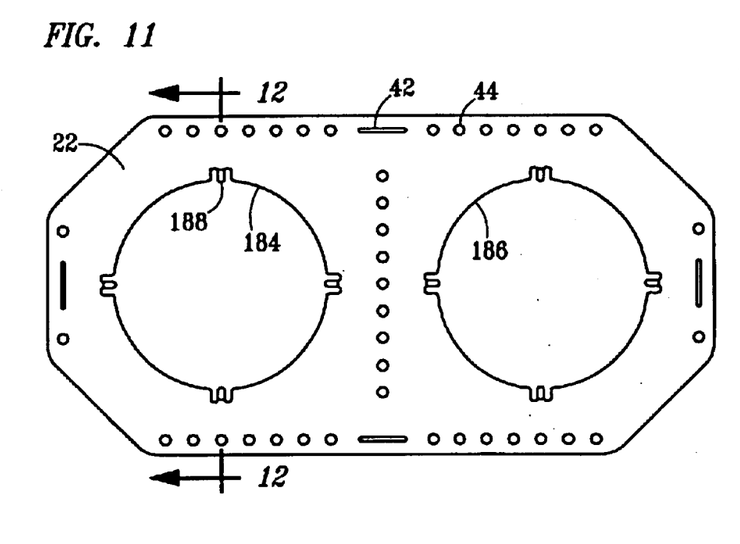
FIG. 11 is an elevation view of a preferred 2-hole mounting plate for use in the combined flush-mount supply line and drain connector system of the invention.
Figure 12:
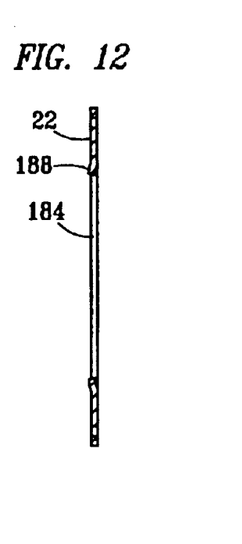
FIG. 12 is a cross-sectional side elevation view taken along line 12—12 of FIG.

FIGS. 11 and 12 depict mounting plate 22, which comprises first and second apertures 184, 186 for use in supporting both a valve holder and a drain elbow as described above. Mounting plate 22 further comprises a plurality of circumferentially spaced projections 188 extending into each of holes or apertures 184, 186 for use in frictionally engaging the ridges or other similarly effective friction-enhancing structures as may be provided on the outside of the collars of the valve holder and drain elbow. Mounting holes 44 and slots 42 for the attachment of straps 24, previously mentioned, are provided around the perimeter of mounting plate 22, and mounting holes 44 are also provided between apertures 184, 186. Mounting plate 22 is preferably made of stamped steel, but can also made of any other similarly effective, durable metal or polymeric material.

Figures 13, 14:
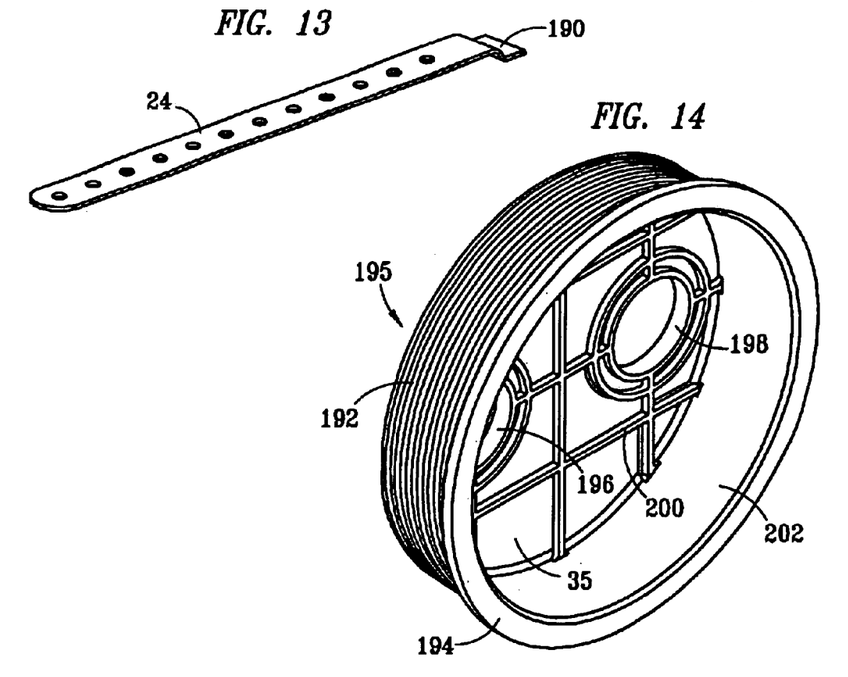
FIG. 13 is a perspective view of a preferred connector strap for use in either of the combined or separate flush-mount supply line and drain connector systems of the invention.
FIG. 14 is a rear perspective view of a preferred dual supply valve holder for use in either the combined flush-mount supply line connector system of the invention or in the separate flush-mount supply line assembly of connector system of the invention.

FIG. 13 depicts a strap 24 of the type that can be satisfactorily used for attaching a mounting plate as described above to a stud, brace or other support in a wall. Tab 190 is desirably provided for use in releasably attaching strap 24 to a slot 42 in a mounting plate 22 as described above. Straps 22 are preferably made of metal but can also be made of a durable polymeric material.

Figure 15:
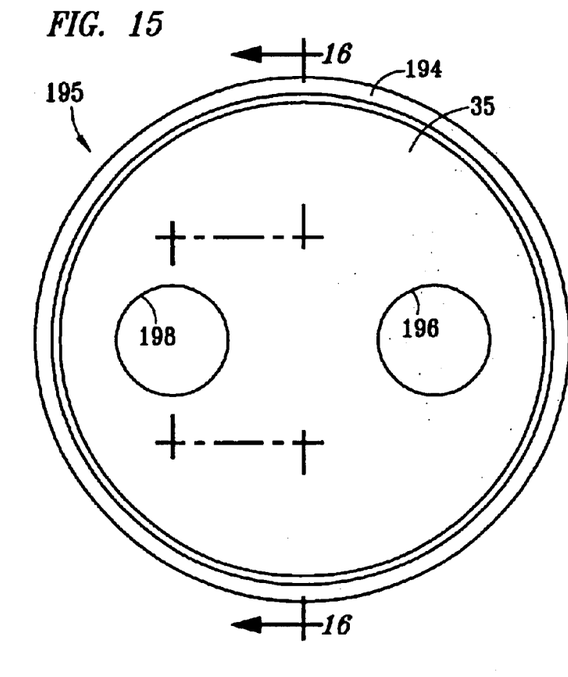
FIG. 15 is a front elevation view of the preferred dual supply valve holder of FIG. 14.
Figure 16:
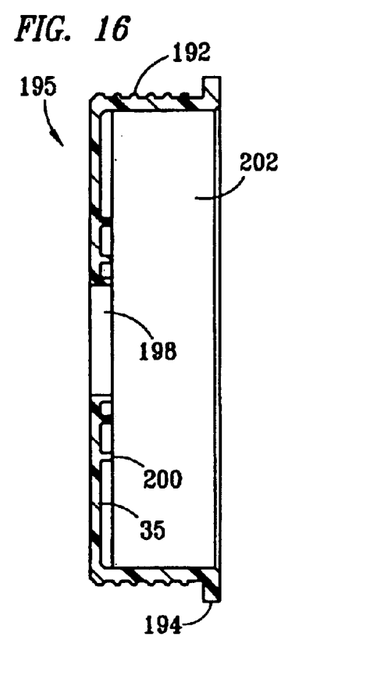
FIG. 16 is a side elevation view of the preferred dual supply valve holder of FIG. 14.

FIGS. 14–16 depict a preferred dual valve holder 195 comprising two apertures 196, 198 for use in attaching dual supply valves to a mounting plate in the flush-mount connector system of the invention. Dual valve holder 195 preferably comprises substantially cylindrical collar 202, front wall 35 (the principal part of dual valve holder 195 that is most visible in FIG. 1) comprising two valve mounting holes 196, 198, and annular flange 194 having an outside-diameter that is desirably greater than the outside diameter of collar 202 to limit the extent to which collar 202 can be inserted through the associated aperture of a mounting plate such as mounting plate 22 described above. A plurality of reinforcing ribs 200 are desirably provided on the back side of front wall 35 to provide additional structural support for the attachment of valves to valve holder 195. Some type of friction-enhancing structure or texturing is preferably provided around the outside of collar 202, and a plurality of axially spaced, circumferentially extending ribs, rings or ridges 192 as shown in FIGS. 14 and 16 are preferred for frictional engagement with projections such as projections 188 of mounting plate 22, discussed above in relation to FIG. 11 and with similar projections on the cover plate (such as projections 98 of cover plate 96 as shown in relation to the collar of a drain elbow in FIG. 4). Dual valve holder 195 is preferably made of a moldable polymeric material that is sufficiently durable to support the valves used in this application. Significantly, dual valve holder 195 can be rotated 360 degrees in relation the plane of the mounting plate to which it is installed, thereby facilitating attachment of the supported valves to supply lines installed in any direction inside a wall.

Figure 17:
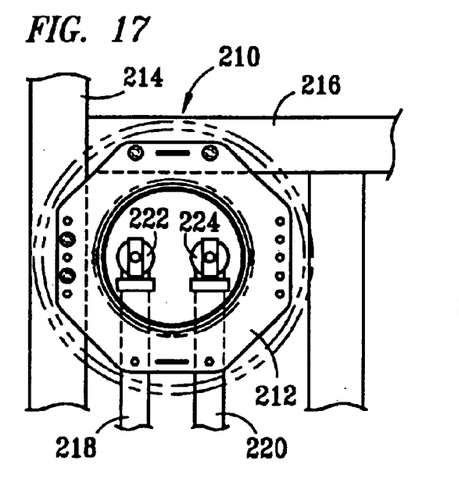
FIG. 17 is a front elevation view of the separate flush-mount supply line connector assembly of FIG. 10, but showing the two supply lines connecting from the bottom rather than from the top.

FIG. 17 depicts an embodiment of the flush-mount connector system of the invention that comprises a connector assembly 210 having a mounting plate 212 with a single aperture and a dual valve holder as described above installed in it. Mounting plate 212 is attached directly to stud 214 and to lateral support member 216 without straps. Valves 222, 224 are oriented so as to be attachable to supply lines 218, 220, respectively, extending upwardly from below. The cover for mounting plate 212 is removed and shown in phantom outline.

Figure 18:
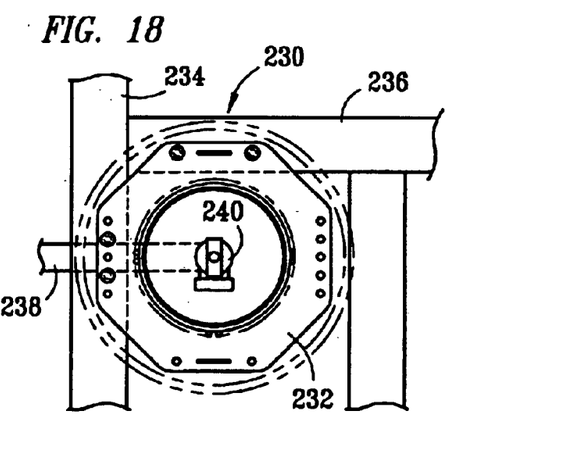
FIG. 18 is a front elevation view of a separate flush-mount supply line connector assembly as in FIG. 17, but showing a single supply line connected from the side.

FIG. 18 depicts an embodiment of the flush-mount connector system of the invention that comprises a connector assembly 230 having a single valve holder supporting valve 240 attached to supply line 238 that enters the stud bay from the side. Mounting plate 232 is attached directly to stud 234 and to lateral brace 236, and the associated front cover is again removed and shown in phantom outline.

Figure 19:
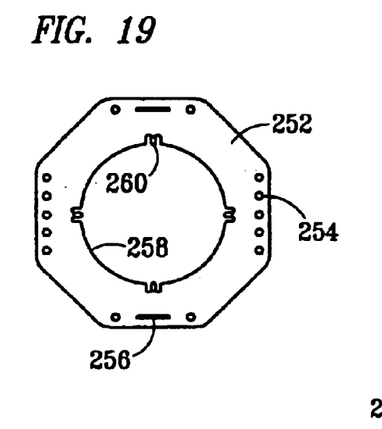
FIG. 19 is an elevation view of a preferred one-hole mounting plate for use in a separate flush-mount supply line or drain connector assembly of the invention.

FIG. 19 depicts a mounting plate 252 that is used in supporting either a single or dual valve holder or a drain elbow in the flush-mount connector systems of the invention. Mounting plate 252 is preferably made of stamped steel or another similarly effective material, and comprises mounting holes 254, strap attachment slots 256, aperture 258 for insertion of either a valve holder or drain elbow as otherwise described herein. Structures such as inwardly facing projections 260 that are circumferentially spaced around aperture 258 are desirably provided to engage, most preferably by friction, the cooperating, outwardly facing engagement structures located on the outside the collar portion of the valve holders or drain elbow.

Figure 20:
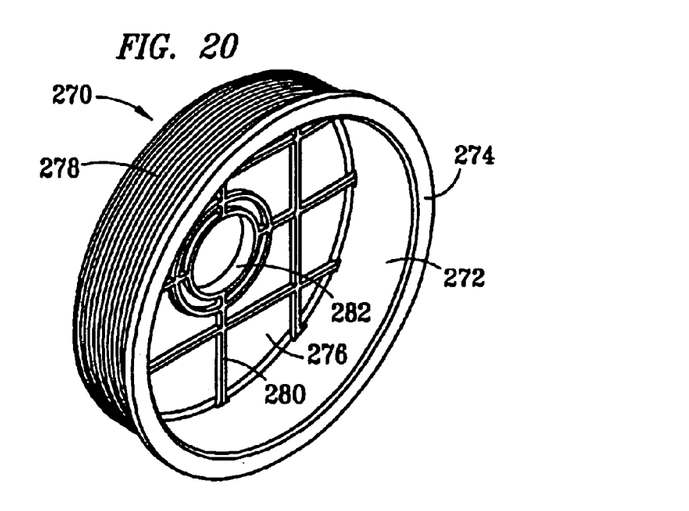
FIG. 20 is a rear perspective view of a preferred single valve holder for use in the separate flush-mount supply line connector assembly of the invention in an installation for a single supply line valve as shown in FIG. 18.

Referring to FIG. 20, a single-hole valve holder 270 is shown that is insertable into an aperture in a mounting plate of the invention in the same manner as dual valve holder 195 previously described in relation to FIGS. 14–16. Single valve holder 270 comprises substantially cylindrical collar 272 having a forwardly facing wall 276 with backing ribs 280 and structurally reinforced hole or aperture 282, and an annular flange 274 disposed around the back edge of collar 272 to limit the extent to which collar 272 can be inserted into the aperture of a mounting plate. As with dual valve holder 195, a plurality of outwardly facing ribs, rings or ridges 278, or other similarly effective friction-enhancing structures, are desirably provided on the outside of collar 272 to provide engagement with cooperating elements of the mounting plate into which valve holder 270 is inserted for use in the flush-mount connector system of the invention.

Other obvious and otherwise non-obvious alterations and modifications of the invention will become apparent to those of ordinary skill in the art upon reading this specification in view of the accompanying drawings, and it is intended that the scope of the invention disclosed herein be limited only by the broadest interpretation of the appended claims to which the inventor is legally entitled.

I claim:

1. A flush-mount connector system useful for attaching supply line valves and drain elbows to in-wall plumbing lines without a conventional in-wall outlet box, the system comprising:
    a valve holder and a drain elbow;
    a mounting plate having a front and back, and further comprising one aperture into which the valve holder is insertable from the back of the mounting plate and in which the valve holder is rotatable, and another aperture into which the drain elbow is insertable from the back of the mounting plate and in which the drain elbow is rotatable, for connection to the in-wall plumbing lines; and
    a removable cover substantially concealing the mounting plate from view.

2. The flush-mount connector system of claim 1 wherein the mounting plate has a first aperture in which the valve holder is and frictionally engageable and a second aperture in which the drain elbow and frictionally engageable.

3. The flush-mount connector system of claim 1 wherein the mounting plate further comprises a plurality of circumferentially spaced projections disposed adjacent to the apertures.

4. The flush-mount connector system of claim 1, further comprising a plurality of straps attachable to the mounting plate.

5. The flush-mount connector system of claim 4, further comprising a plurality of slots to which the straps are releasably attachable.

6. The flush-mount connector system of claim 1, further comprising a plurality of mounting holes disposed in the mounting plate.

7. The flush-mount connector system of claim 1 wherein the valve holder and drain elbow are each rotatably mounted in their respective apertures.

8. The flush-mount connector system of claim 1 comprising a valve holder attachable to a single valve.

9. The flush-mount connector system of claim 1 comprising a valve holder attachable to dual valves.

10. The flush-mount connector system of claim 1 comprising a drain elbow having a forwardly facing, removable test cap.

11. The flush-mount connector system of claim 10 wherein the forwardly facing test cap further comprises a threaded hose connector.

12. The flush-mount connector system of claim 10 wherein the threaded hose connector further comprises a removable test plug.

13. The flush-mount connector system of claim 1 comprising a drain elbow having a condensate connection port.

14. The flush-mount connector system of claim 13 wherein the condensate connection port has a removable cover.

15. The flush-mount connector system of claim 1 wherein each of the valve holder and drain elbow has a substantially cylindrical collar that is insertable through an aperture in the mounting plate.

16. The flush-mount connector system of claim 15 wherein the collar further comprises an outside wall having a plurality of axially spaced, circumferentially extending engagement rings.

17. The flush-mount connector system of claim 15 wherein each of the valve holder and drain elbow has a flange extending radially outward behind the collar, the flange having an outside diameter too great to be insertable through the respective aperture.

18. The flush-mount connector system of claim 1 wherein the mounting plate is made of metal.

19. The flush-mount connector system of claim 1 wherein the valve holder and a drain elbow each comprise a polymeric material.

20. The flush-mount connector system of claim 1 wherein the cover comprises a polymeric material.

21. The flush-mount connector system of claim 1 wherein the mounting plate is installable so that the valve adapter is connectable to an in-wall plumbing line in a first stud bay of a wall and the drain elbow is connectable to an in-wall plumbing line in a different stud bay of the wall.

* * * * *